(No Model.) 2 Sheets—Sheet 1.
J. F. DEVOLD & G. MONRATH.
T. Devold & O. E. Ray, Administrators of J. F. Devold, Deceased.
POWER TRANSMISSION.
No. 471,812. Patented Mar. 29, 1892.
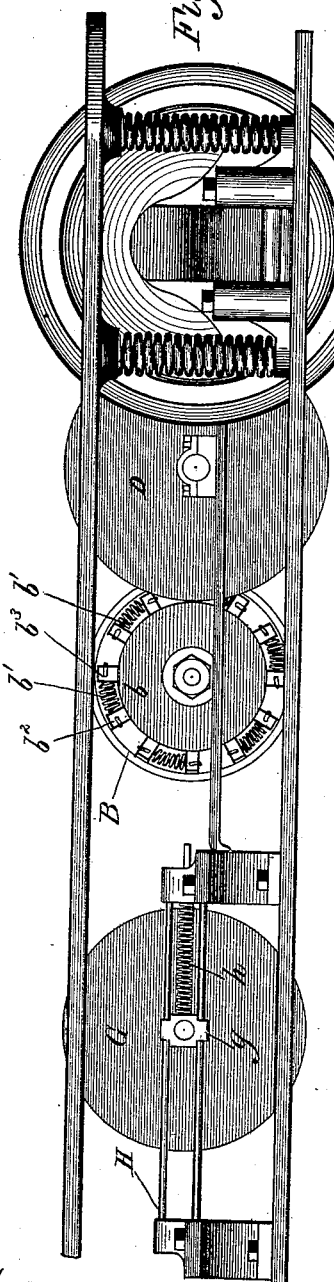
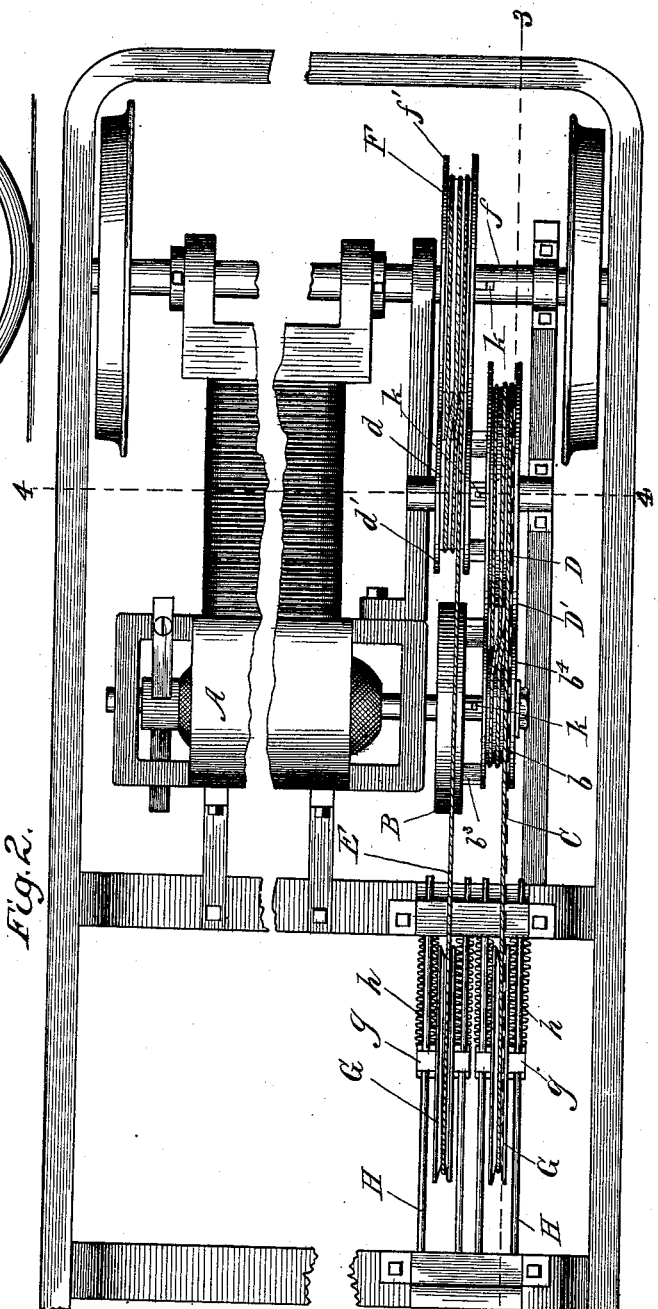
Witnesses
Inventors (No Model.) 2 Sheets—Sheet 2.
J. F. DEVOLD & G. MONRATH.
T. Devold & O. E. Ray, Administrators of J. F. Devold, Deceased.
POWER TRANSMISSION.
No. 471,812. Patented Mar. 29, 1892.
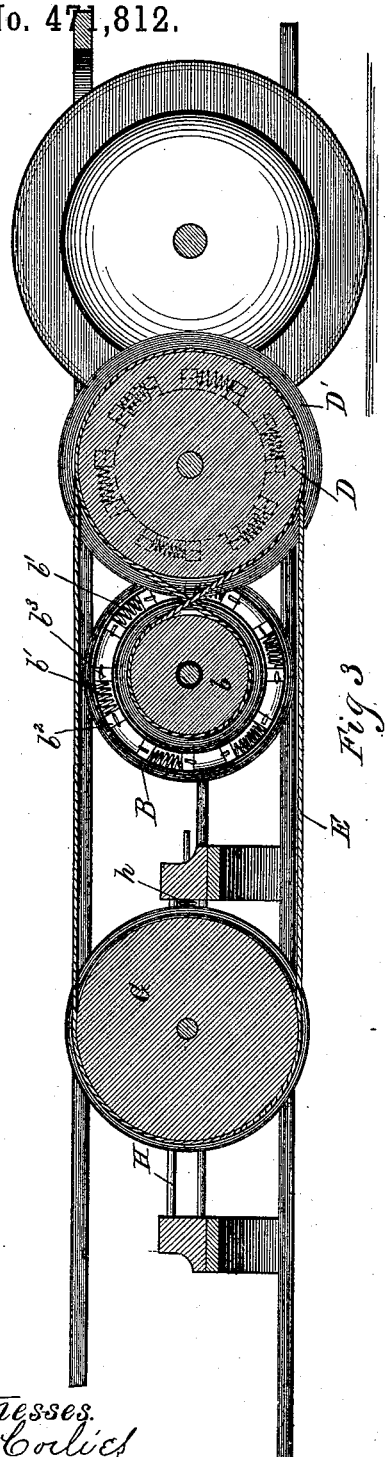
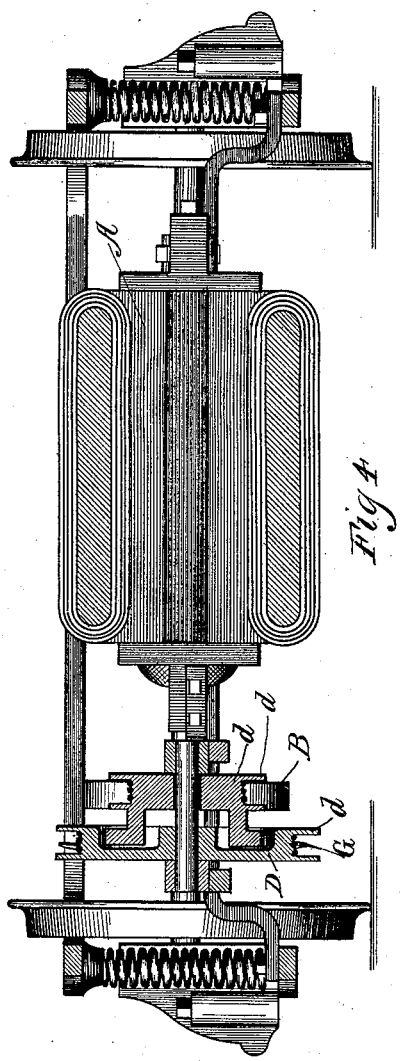
Witnesses.
Inventors.

UNITED STATES PATENT OFFICE.

JOHN F. DEVOLD AND GUSTAV MONRATH, OF CHICAGO, ILLINOIS; THEODOR DEVOLD AND OLAF E. RAY ADMINISTRATORS OF SAID JOHN F. DEVOLD, DECEASED.

POWER-TRANSMISSION.

SPECIFICATION forming part of Letters Patent No. 471,812, dated March 29, 1892.

Application filed February 2, 1891. Serial No. 379,869. (No model.)

*To all whom it may concern:*

Be it known that we, JOHN F. DEVOLD and GUSTAV MONRATH, citizens of Norway and Denmark, respectively, residing at Chicago, in the county of Cook and State of Illinois, have invented certain new and useful Improvements in Power-Transmission; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in power-transmission, particularly as applied to motor street-cars; and it consists in the novel arrangement of springs, pulleys, and cables, as hereinafter fully described, and as shown in the accompanying drawings, in which—

Figure 1 shows a side elevation of a portion of the running-gear of a street-car with our improvements. Fig. 2 shows a plan view of the same. Fig. 3 is a vertical section on the line 3 3, Fig. 2. Fig. 4 is a transverse vertical section on the line 4 4, Fig. 2.

In the use of the electric motor for propelling street-cars difficulty has arisen because of the necessity for starting the motor at a high rate of speed and the impossibility of starting the car at a corresponding speed, the result being a great loss of power and great danger of burning out the armature of the motor. We have overcome these difficulties by the use of double driving-pulleys, one of which is loose upon its shaft and driven by means of elastic connection with its mate and by combining a rope or cable and friction transmission.

While our device is specially adapted for use in connection with electric motors, it is obvious that it may be used with a gas or any other form of motor.

In the drawings we have shown an ordinary form of electric motor A, supported by the frame of the car. A fixed pulley B is mounted upon the armature-shaft, and a loose pulley $b$ is carried by the same shaft and connected with the fixed pulley B by means of the spiral springs $b'$ $b'$. One end of each of these springs is attached to a lug $b^2$ upon the pulley B, and the other end thereof is attached to a similar lug $b^3$ upon the pulley $b$. A series of springs radiating from a common hub might be substituted for the pulley B without departing from the principle of construction.

A drive rope or cable C is wound two or more times upon the fixed pulley $b$ and upon the pulley D, carried upon a counter-shaft journaled in a suitable bracket depending from the frame of the car. A loose pulley $d$ is mounted upon the same counter-shaft and connected with the pulley D in a manner precisely similar to that shown in the pulleys B and $b$ already described. A drive rope or cable E is wound upon the pulley $d$ and also upon the pulley F, which is keyed upon the wheel-axle $f$ of the car-truck. The pulleys B F D are fixed to their respective shafts by the keys $k$, as shown.

The pulleys G G, journaled in the sliding blocks $g$ $g$, carried upon the parallel bars H H, supported by brackets depending from the frame of the car, are used for the purpose of tightening the ropes C and E. Interposed between the blocks $g$ $g$ and the bracket supporting one end of the bars H H are the spiral springs $h$ $h$. The ropes C and E should be short enough to somewhat compress the springs $h$ $h$, so that any slack will be taken up by the expansion of the springs.

The pulleys $b$, D, $d$, and F are provided with radial flanges $b^4$, D', $d'$, and $f'$ upon their peripheries, as shown in Fig. 2, and are so adjusted that the faces of the flanges upon co-operating pulleys come into frictional contact, whereby the strain of the driving-ropes upon the journals is counteracted. The central apertures in the driving-pulleys $b$ and $d$ are larger than the shafts by which they are carried, so that in the event of the wearing away of the faces of the flanges of the pulleys it will not be necessary to change the location of the shafts in order to maintain the pressure of the one pulley upon the other.

The springs $b'$ $b'$ are shown in the drawings to be six in number for each pair of pulleys. The number is entirely immaterial. The strength of the springs must be such that when the car is well under way the springs will be but slightly compressed. In starting the car the springs will be considerably compressed, gradually resuming their normal position as the inertia of the car is overcome. While these springs are of especial value in starting the car, it will be seen that they are very serviceable in preventing jarring of the machinery due to sudden stoppage or starting.

It will be seen that the principle involved in our invention will not be departed from if the pulley upon the car-axle is driven directly by the pulley upon the motor-shaft; or, if desired, the number of intermediate pulleys may be increased.

We claim as our invention—

1. In a power-transmitter, the combination, with a motor, of double driving-pulleys, one of which is fixed and the other of which is loose upon the shaft, and springs for connecting said pulleys, substantially as described, and for the purposes set forth.

2. In a power-transmitter, the combination, with a motor, of double driving-pulleys, one of which is fixed and the other of which is loose upon the shaft, springs for connecting said pulleys, keyed driven pulleys, cables uniting the loose driving-pulley with its co-operating driven pulley, and radially-projecting flanges upon the loose and driven pulleys, the flanges of co-operating pulleys being in frictional contact, substantially as described, and for the purposes set forth.

3. In a power-transmitter having a series of pulleys carrying driving-cables, the combination of fixed driven pulleys with loose driving-pulleys having central apertures of greater diameter than their shafts, fixed pulleys, as B and D, mounted upon the same shaft with and adjacent to the loose pulleys, and a series of springs connecting said loose pulleys with said pulleys B and D, substantially as described, and for the purposes set forth.

4. In a motor car-truck, the combination, with an electric motor, of a series of pulleys comprising a fixed and loose pulley B and $b$ upon the motor-shaft, a fixed pulley F upon the car-axle, and a fixed and loose pulley D and $d$, carried by a counter-shaft, radially-projecting flanges upon the pulleys $b$, D, $d$, and F, the faces of the flanges upon the pulleys $b$ and D being in frictional contact and the faces of the flanges upon the pulleys $d$ and F being in frictional contact, a driving-rope C, carried upon the pulleys $b$ and D, a driving rope or cable E, carried upon the pulleys $d$ and F, a series of springs, each of which is attached at one end to the pulley B and at the other end to the pulley $b$, a second series of springs, each of which is attached at one end to the pulley D and at the other end to the pulley $d$, a pair of loose or idle pulleys G G, slidable journal-blocks $g$ $g$ for carrying said idle-pulleys, a spiral spring bearing against each of the blocks $g$ $g$ and against a fixed base and normally tending to force said blocks away from the working pulleys, and the cables C and E, each passing over one of the idle-pulleys G G, substantially as described, and for the purposes set forth.

In testimony whereof we affix our signatures in presence of two witnesses.

JOHN F. DEVOLD.
GUSTAV MONRATH.

Witnesses:
W. J. HENDERSON,
K. A. RICHARDS.